US010459322B2

(12) United States Patent
Kase

(10) Patent No.: US 10,459,322 B2
(45) Date of Patent: Oct. 29, 2019

(54) LIGHT SOURCE SYSTEM AND PROJECTOR

(71) Applicant: CASIO COMPUTER CO., LTD., Shibuya-ku, Tokyo (JP)

(72) Inventor: Toshifumi Kase, Fuchu (JP)

(73) Assignee: CASIO COMPUTER CO., LTD., Tokyo (JP)

(*) Notice: Subject to any disclaimer, the term of this patent is extended or adjusted under 35 U.S.C. 154(b) by 0 days.

(21) Appl. No.: 15/883,482

(22) Filed: Jan. 30, 2018

(65) Prior Publication Data

US 2018/0275497 A1    Sep. 27, 2018

(30) Foreign Application Priority Data

Mar. 21, 2017  (JP) ................................. 2017-053906

(51) Int. Cl.

| G03B 21/16 | (2006.01) |
| G03B 21/20 | (2006.01) |
| G02B 27/09 | (2006.01) |
| H05B 33/08 | (2006.01) |
| G02B 5/00 | (2006.01) |
| G02B 26/08 | (2006.01) |
| G02B 27/10 | (2006.01) |
| G02B 27/14 | (2006.01) |

(52) U.S. Cl.
CPC ......... *G03B 21/2033* (2013.01); *G02B 5/003* (2013.01); *G02B 26/0833* (2013.01); *G02B 27/0955* (2013.01); *G02B 27/1066* (2013.01); *G02B 27/143* (2013.01); *G03B 21/16* (2013.01); *G03B 21/2066* (2013.01); *H05B 33/0842* (2013.01); *Y02B 20/346* (2013.01)

(58) Field of Classification Search
CPC .... G03B 21/008; G03B 21/16; G03B 21/145; G03B 21/208; G03B 21/2013; G03B 21/2066; H04N 9/31; H04N 9/315; H04N 9/3111; H04N 9/3141; H04N 9/3144; H04N 9/3164
See application file for complete search history.

(56) References Cited

U.S. PATENT DOCUMENTS

| 6,908,197 B2* | 6/2005 | Penn | ...................... G02B 5/04 348/771 |
| 2005/0237620 A1* | 10/2005 | Hsu | ...................... G02B 7/181 359/618 |
| 2013/0083297 A1* | 4/2013 | Miyazaki | ............. G03B 21/204 353/31 |
| 2014/0198304 A1* | 7/2014 | Sun | ...................... G03B 21/16 353/61 |

FOREIGN PATENT DOCUMENTS

JP    2013156318 A    8/2013

* cited by examiner

*Primary Examiner* — Sultan Chowdhury
(74) *Attorney, Agent, or Firm* — Holtz, Holtz & Volek PC

(57) ABSTRACT

A light source system according to an aspect of the invention comprises a light source unit, an optical path switching device configured to selectively switch a direction of light from the light source unit between a plurality of directions, and a heat dissipating unit positioned in one of the plurality of directions and isolated from the optical path switching device via a light transmitting member.

20 Claims, 7 Drawing Sheets

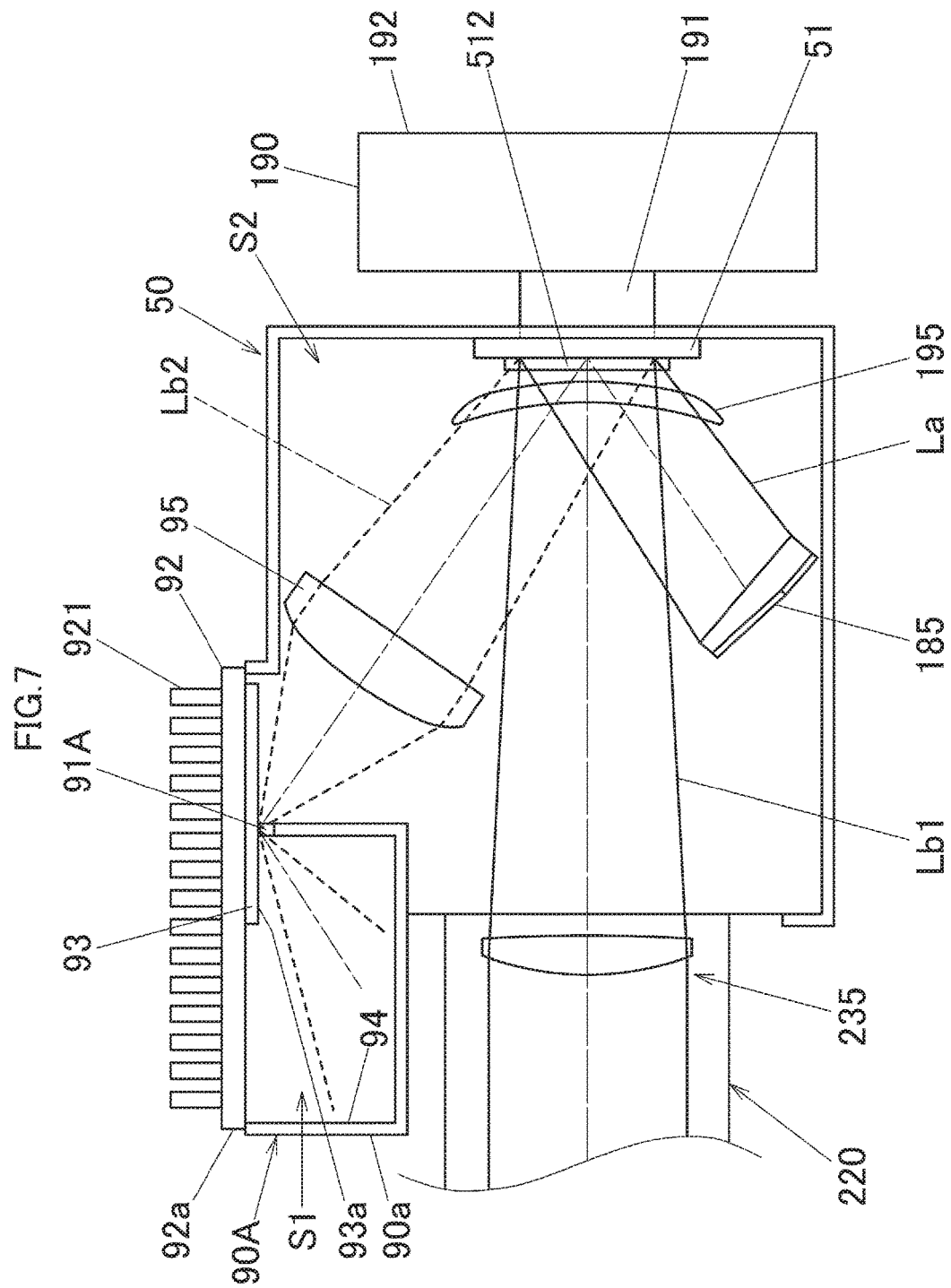

LIGHT SOURCE SYSTEM AND PROJECTOR

CROSS-REFERENCE TO RELATED APPLICATION

This application is based upon and claims the benefit of priority under 35 USC 119 from Japanese Patent Application No. 2017-053906 filed on Mar. 21, 2017, the entire disclosure of which, including the specification, claims, drawings and abstract, is incorporated herein by reference.

BACKGROUND OF THE INVENTION

Field of the Invention

The present invention relates to a light source system and a projector including this light source system.

Description of the Related Art

Data projectors are widely used, in these days, on many occasions as a projection system for projecting a screen and video images of a personal computer and images based on image data recorded on a memory card or the like. In these data projectors, light emitted from a light source is collected on a micromirror display device called a Digital Micromirror Device (DMD) or a liquid crystal panel to display a color image on a screen.

A projector disclosed, for example, in Japanese Unexamined Patent Application No. 2013-156318 includes micromirrors and a projecting device. The micromirrors reflect light from a light source towards a projection lens when they are in an "on" position, whereas when they are in an "off" position, the micromirrors reflect the light from the light source in other directions than the direction towards the projection lens. The projecting device projects a projected image generated by reflecting the light from the light source by the micromirrors via a projection lens onto a projected image display device such as a screen. The light reflected by the micromirrors in the "off" position is discarded as discarded light and hence is not used to generate the projected image.

The dust-proof performance is demanded for projectors in these days. This requires an increase in sealing property inside a case for an optical unit to prevent the intrusion of dust. However, increasing the sealing property of the case often leads to an increase in quantity of head remaining in an interior of the case, and this requires modules disposed inside the case such as a luminescent plate and a DMD that have to be used in a severely restricted temperature range to be cooled in a more highly efficient fashion.

In a case where a DMD is used as a display device of a light source system, in projecting a black color of light, almost all light emitted from the light source system is discarded uselessly within the case. This often increases the temperature inside the case due to the light being so shined within the case. Thus, it is considered that the members fail that are disposed within the case and whose operation temperatures are restricted.

SUMMARY OF THE INVENTION

The present invention has been made in view of the situations described above, and an object thereof is to provide a light source system that increases its heat dissipating performance and a projector including this light source system.

According to an aspect of the invention, there is provided a light source system including a light source unit, an optical path switching device configured to selectively switch a direction of light from the light source unit between a plurality of directions, and a heat dissipating unit positioned in one of the plurality of directions and isolated from the optical path switching device via a light transmitting member.

According to another aspect of the invention, there is provided a projector comprising a light source unit, a display device configured to selectively switch a direction of light from the light source unit between a plurality of directions to form an optical image, a projection lens configured to project an optical image from the display device, and a heat dissipating unit isolated from the display device via a light transmitting member and on which light from the display device is incident as a result of the light from the display device being shined in a different direction from a direction towards the projection lens.

BRIEF DESCRIPTION OF THE SEVERAL VIEWS OF THE DRAWINGS

FIG. 7 is a schematic diagram illustrating the configurations of a display device, a heat dissipating unit and a projection lens of a projector according a second embodiment of the invention.

DETAILED DESCRIPTION OF THE PREFERRED EMBODIMENTS

First Embodiment

Figure 1:
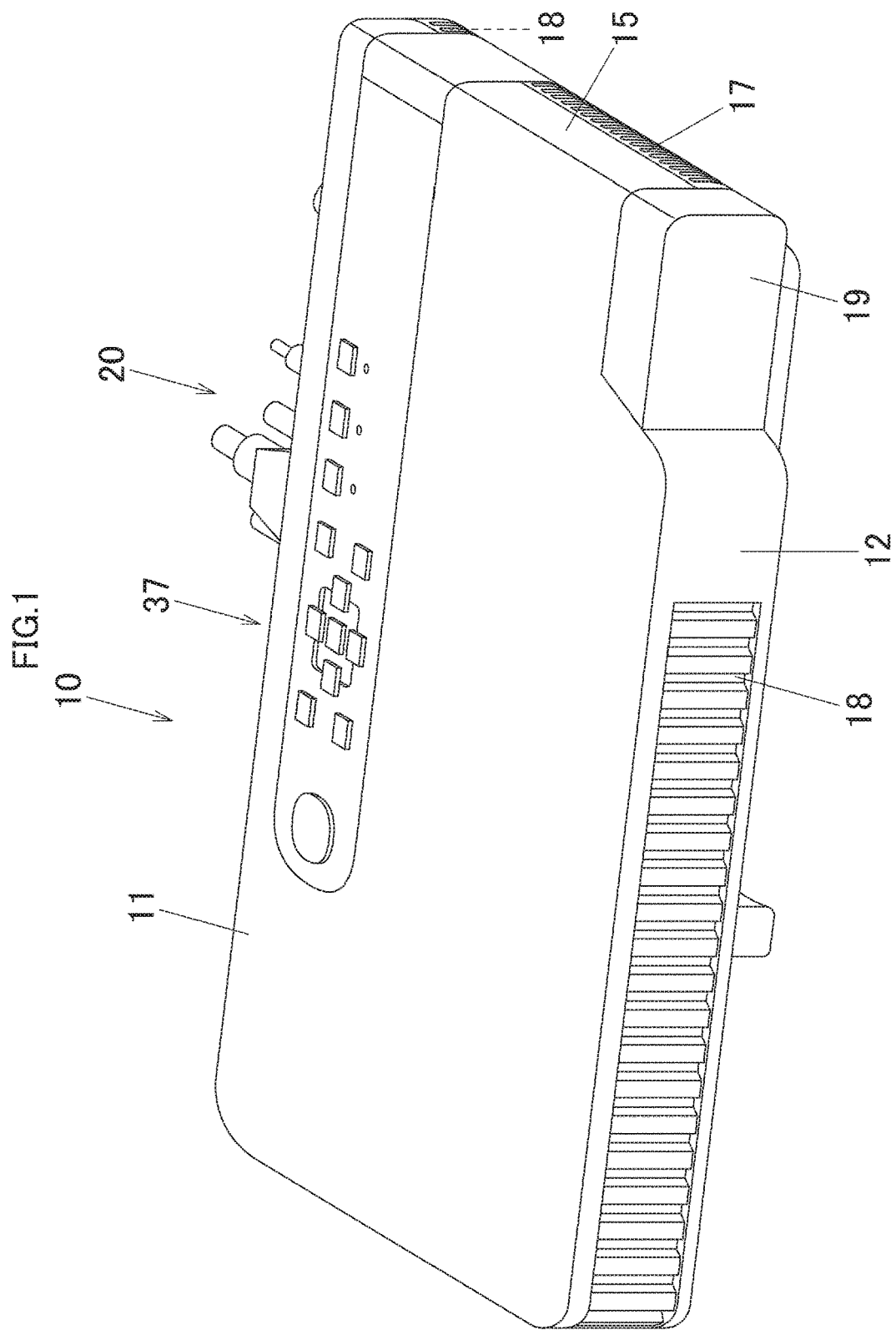
FIG. 1 is an external perspective view of a projector according to a first embodiment of the invention.

Hereinafter, a first embodiment of the invention will be described by the use of the drawings. FIG. 1 is an external perspective view of a projector 10. In the following description, when left and right are referred to in relation to the projector 10, they denote, respectively, left and right directions in relation to a projecting direction of the projector 10. When front and rear are referred to in relation to the projector 10, they denote, respectively, front and rear directions in relation to the direction of a screen and a traveling direction of a pencil of light from the projector 10.

The projector 10 has a substantially rectangular parallelepiped shape as shown in FIG. 1. The projector 10 has a lens cover 19 that covers a projection port to a side of a front panel 12 that is a front side panel of a casing of the projector 10. The projector 10 includes an Ir reception unit configured to receive a control signal from a remote controller, not illustrated.

A keys/indicators unit 37 is provided on an upper panel 11 of the casing. Disposed on this keys/indicators unit 37 are keys and indicators which include a power supply switch key, a power indicator, a projection switch key, an overheat indicator, and the like. The power indicator informs whether a power supply is on or off. The projection switch key switches on or off the projection by the projector 10. The overheat indicator informs of an overheat condition occurring in a light source system, a display device, a control unit or the like when they really overheat.

Various types of terminals (a group of terminals) 20 including an input/output connector unit, a power supply adaptor plug and the like are provided on a back panel of the casing. The input/output connector unit includes a USB terminal, a video signal input D-SUB terminal into which analog RGB video signals are inputted, an S terminal, an RCA terminal, a voice output terminal and the like. A plurality of inside air outlet ports 17 are formed in each of a right panel of the casing, which is not illustrated, and a left panel 15 of the casing illustrated in FIG. 1. Additionally, outside air inlet ports 18 are formed in the front panel 12, a corner portion of the left panel 15 that lies in the vicinity of the back panel, and the back panel.

Figure 2:
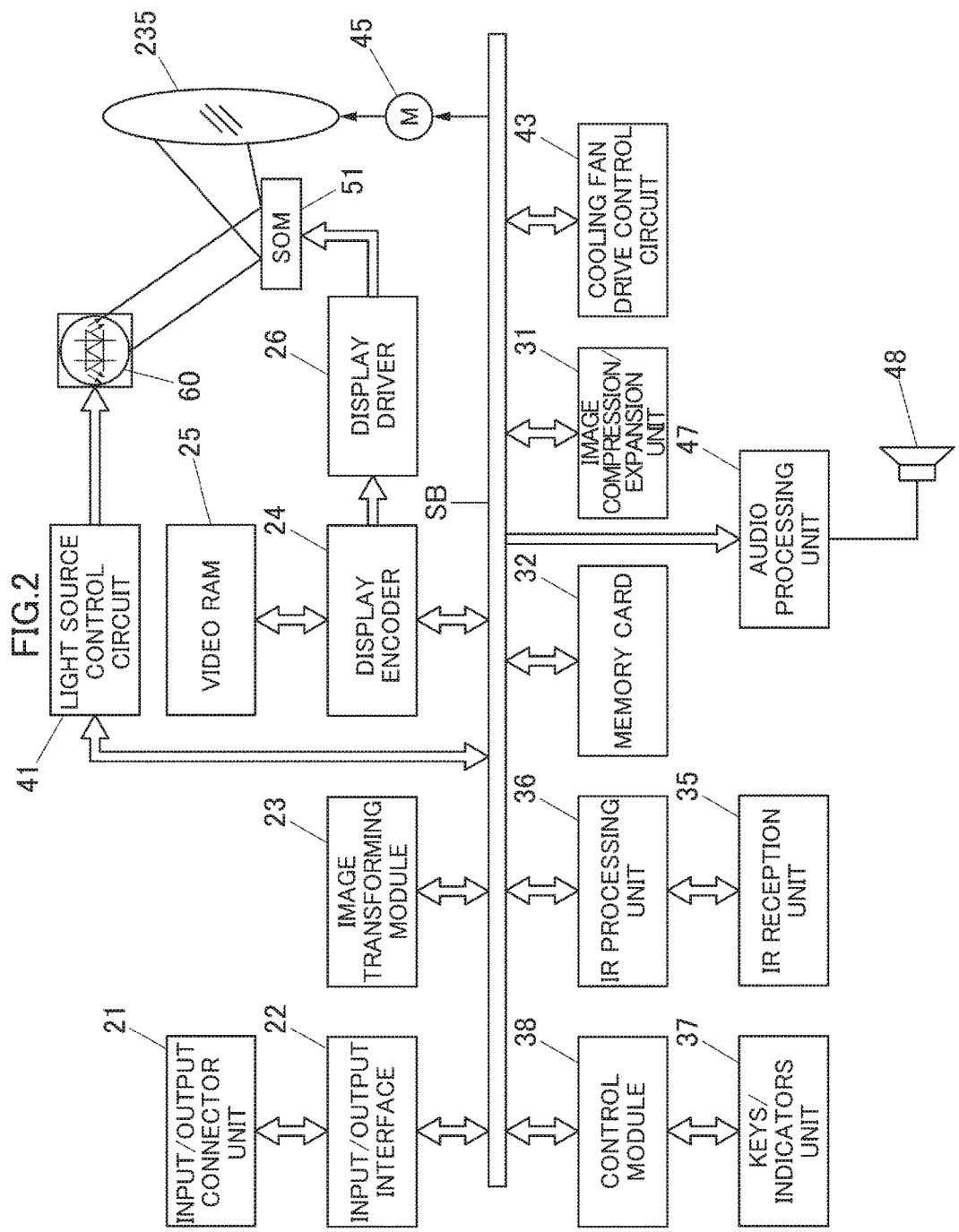
FIG. 2 is a block diagram illustrating functional blocks of the projector according to the first embodiment of the invention.

Next, a projector control unit of the projector 10 will be described by the use of a functional block diagram illustrated in FIG. 2. The projector control unit includes a control module 38, an input/output interface 22, an image transforming module 23, a display encoder 24, a display driver 26 and the like.

The control module 38 governs the control of respective operations of circuitries within the projector 10 and is made up of a CPU, a ROM which stores in a fixed fashion operation programs of various types of settings, a RAM which is used as a working memory and the like.

Image signals of various standards which are inputted from the input/output connector unit 21 are sent via the input/output interface 22 and a system bus (SB) to the image transforming module 23 where the image signals are transformed so as to be unified into an image signal of a predetermined format which is suitable for display by the projector control unit. Thereafter, the unified image signal is outputted to the display encoder 214.

The display encoder 24 deploys the inputted image signal on a video RAM 25 for storage therein and generates a video signal from the contents stored in the video RAM 25, outputting the video signal so generated to the display driver 26.

The display driver 26 functions as a display device control module. The display driver 26 drives a display device 51, which is a spatial optical modulator (SOM), at an appropriate frame rate according to the image signal outputted from the display encoder 24. In this embodiment, a DMD is used as the display device 51. The display driver 26 causes a pencil of light emitted from a light source unit 60 to be shined on to the display device 51 by way of a light source side optical system, which will be described later, and forms an optical image using reflected light from the display device 51. A light source system includes the light source unit 60 and a light source-side optical system 170. Light source light is emitted by way of a projection lens 220, and an image is projected on to a projected image receiving device such as a screen, not illustrated, for display thereon.

It should be noted that a movable lens group 235 of the projection lens 220 is driven for zooming and focusing by a lens motor 45.

An image compression/expansion unit 31 performs a recording operation in which a luminance signal and a color difference signal of an image signal are data compressed through ADCT and Huffman coding processes and the compressed data is sequentially written on a memory card 32 which is configured as a detachable recording medium.

With the projector 10 set in a reproducing mode, the image compression/expansion unit 31 reads out the image data recorded on the memory card 32 and expands the individual image data which make up a series of dynamic images frame by frame. Then, the image compression/expansion unit 31 outputs the image data to the display encoder 24 by way of the image transforming module 23 so as to enable the display of dynamic images based on the image data stored on the memory card 32.

Operation signals generated at the keys/indicators unit 37 which includes the main keys and indicators which are provided on the upper panel 11 are sent out directly to the control module 38. Key operation signals from the remote controller are received by the IR reception unit 35 and are then demodulated into a code signal at an IR processing unit 36 for output to the control module 38.

An audio processing unit 47 is connected to the control module 38 byway of the system bus (SB). This audio processing module 47 includes a circuitry for a sound source such as a PCM sound source. When the projector 10 is in a projection mode and the reproducing mode, the audio processing unit 47 converts audio data into analog signals and drives a speaker 48 to output loudly sound or voice based on the audio data.

The control module 38 controls a light source control circuit 41 which is configured as a light source control unit. The light source control circuit 41 controls separately the operations of an excitation light source and a red light source device to emit light of a red wavelength range, light of a green wavelength range and light of a blue wavelength range at predetermined timings so that lights of specified wavelength ranges required in forming an image are emitted from the light source unit 60.

Further, the control module 38 causes a cooling fan drive control circuit 43 to detect temperatures through a plurality of temperature sensors which are provided in the light source unit 60 so as to control the rotating speeds of cooling fans based on the results of the temperature detections. Additionally, the control module 38 also causes the cooling fan drive control circuit 43 to keep the cooling fans rotating by use of a timer even after the power supply to a main body of the projector 10 is switched off. Alternatively, the control module 38 causes the cooling fan drive control circuit 43 to cut off the power supply to the main body of the projector 10 depending upon the results of the temperature detections by the temperature sensors.

Figure 3:
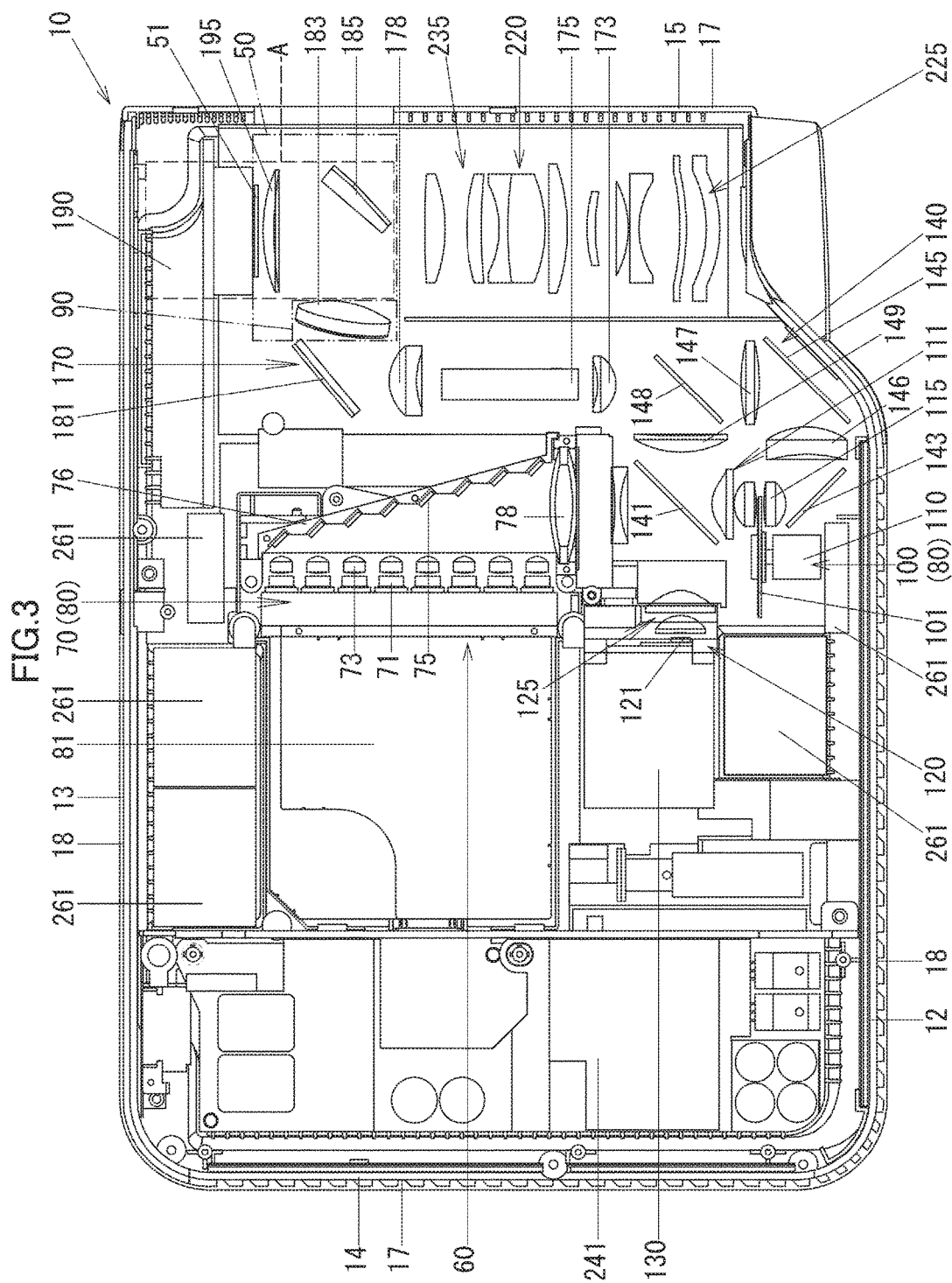
FIG. 3 is a schematic plan view illustrating an internal construction of the projector according to the first embodiment of the invention.

Next, an internal construction of the projector 10 will be described based on FIG. 3. FIG. 3 is a schematic plan view illustrating an internal construction of the projector 10. The projector 10 includes a control circuit board 241 near the right panel 14. This control circuit board 241 includes a power supply circuit block and a light source control block. In addition, the projector 10 includes the light source unit 60 which is disposed to a side of the control circuit board 241, that is, in a substantially central portion of the casing of the projector 10. Further, in the projector 10, the light source-side optical system 170 and the projector lens 220 are disposed between the light source unit 60 and the left panel 15.

The light source unit 60 includes an excitation light shining device 70 which functions not only as a light source of light of a blue wavelength range but also as an excitation light source, a red light source device 120 which functions as a light source of light of a red wavelength range and a green light source device 80 which functions as a light source of light of a green wavelength range. The green light source device 80 is made up of the excitation light shining device 70 and a luminescent plate device 100. A light guiding optical system 140 is disposed in the light source unit 60. This light guiding optical system 140 guides light of the blue wavelength range, light of the green wavelength range and light of the red wavelength range. The light guiding optical system 140 collects lights of the blue, green and red wavelength ranges emitted respectively from the excitation light shining device 70, the green light source device 80 and the red light source device 120 to an entrance port of a light tunnel 175.

The excitation light shining device 70 is disposed at a substantially central portion of the casing of the projector 10 in relation to a left-and-right direction thereof and near the back panel 13. The excitation light shining device 70 includes a light source group of blue laser diodes 71, which constitutes a first light source, a reflection mirror group 75, a collective lens 78 and a heat sink 81. The light source group includes the blue laser diodes 71 which are a plurality of semiconductor light emitting elements. The blue laser diodes 71 are disposed so that their optical axes become parallel to the back panel 13. The reflection mirror group 75 turns an axis of light emitted from each of the blue laser diodes 71 through 90 degrees to the direction of the front panel 12. The collective lens 78 collects light emitted from each of the blue laser diodes 71 and then reflected by the reflection mirror group 75. The heat sink 81 is disposed between the blue laser diodes 71 and the right panel 14.

In the light source group, the blue laser diodes 71, which are the plurality of semiconductor light emitting elements, are arranged into a matrix configuration. In addition, collimator lenses 73 are disposed individually on the optical axes of the blue laser diodes 71. The collimator lenses 73 transform light emitted from the blue laser diodes 71 into parallel light so as to enhance the directivity of the emitted light. In the reflection mirror group 75, a plurality of reflection mirrors are arranged into a step-like configuration and are integrated with a mirror base plate 76 while being adjusted in position. Thus, the reflection mirrors of the reflection mirror group 75 reduce sectional areas of pencils of light emitted from the blue laser diodes 71 in one direction to emit them to the collective lens 78.

A cooling fan 261 is disposed between the heat sink 81 and the back panel 13. The blue laser diodes 71 are cooled by the cooling fan 261 and the heat sink 81. A cooling fan 261 is disposed further between the reflection mirror group 75 and the back panel 13. This cooling fan 261 cools the reflection mirror group 75 and the collective lens 78.

The red light source device 120 includes a red light source 121 and a collective lens group 125. The red light source 121 is disposed so that its optical axis becomes parallel to the blue laser diodes 71. The collective lens group 125 collects light emitted from the red light source 121. The red light source 121 is a red light emitting diode which is a semiconductor light emitting element. The red light source 121 emits light of a red wavelength range. An axis of light of the red wavelength range emitted from the red light source device 120 intersects an axis of light of a blue wavelength range emitted from the excitation light shining device 70 and then reflected by the reflection mirror group 75 and an axis of light of a green wavelength range emitted from a luminescent plate 101. The red light source device 120 also includes a heat sink 130 which is disposed on a side of the red light source 121 which faces the right panel 14, and this heat sink 130 cools the red light source 121. A cooling fan 261 is disposed between the heat sink 130 and the front panel 12. Thus, the red light source 121 is cooled by the cooling fan 261 and the heat sink 130.

The luminescent plate device 100 which makes up the green light source device 80 is disposed on an optical path of excitation light emitted from the excitation light shining device 70 and in the vicinity of the front panel 12. The luminescent plate device 100 includes the luminescent plate 101, a motor 110, a collective lens group 111 and a collective lens 115. The luminescent plate 101 is a luminescent wheel and is disposed so as to be parallel to the front panel 12, that is, so as to intersect an axis of light emitted from the excitation light shining device 70 at right angles. The motor 110 drives the luminescent plate 101 rotationally. The collective lens group 111 collects a pencil of excitation light emitted from the excitation light shining device 70 to the luminescent plate 101 and also collects a pencil of light emitted from the luminescent plate 101 in the direction of the back panel 13. The collective lens 115 collects a pencil of light emitted from the luminescent plate 101 in the direction of the front panel 12. A cooling fan 261 is disposed between the motor 110 and the front panel 12, so that the luminescent plate device 100 is cooled by this cooling fan 261.

A luminous light emitting area and a light transmitting area are provided end to end continuously in a circumferential direction on the luminescent plate 101. The luminous light emitting area receives light shined from the excitation light shining device 70 by way of the collective lens group 111 as excitation light and emits luminous light of the green wavelength range. The light transmitting area transmits excitation light emitted from the excitation light shining device 70 or transmits such excitation light while diffusing it.

A base material of the luminescent plate 101 is a metallic base material made of copper, aluminum or the like. An annular groove is formed on a surface of this base material which faces the excitation light shining device 70. A bottom portion of the groove is mirror finished through silver deposition or the like. Then, a green luminescent material layer is laid out on a mirror finished surface of the annular groove. In a case where the light transmitting area is configured into an area which transmits excitation light, a transparent base material having a light transmitting property is fitted in a through hole portion formed in the base material by cutting out a portion thereof. In a case where the light transmitting area is configured into an area which transmits excitation light while diffusing it, a transparent base material on a surface of which minute irregularities are formed through sandblasting is fitted in the through hole portion cut in the base material.

When light of the blue wavelength range emitted from the excitation light shining device 70 is shined on to the green luminescent material layer on the luminescent plate 101, a green luminescent material in the green luminescent material layer is excited, and the luminescent plate 101 emits light of the green wavelength range in every direction as luminous light. Light of the green wavelength range is emitted towards the back panel 13 to be incident on the collective lens group 111. On the other hand, light of the blue wavelength range emitted from the excitation light shining device 70 to be incident on the light transmitting area passes through the luminescent plate 101 or passes therethrough in the form of diffuse transmission and is then incident on the collective lens 115 which is disposed on a back side (in other words, a side facing the front panel 12) of the luminescent plate 101.

The light guiding optical system 140 includes collective lenses for collecting pencils of light of the red wavelength range, green wavelength range and blue wavelength range, reflection mirrors and dichroic mirrors for turning axes of pencils of light of the red, green and blue wavelength ranges so as to align them in the same direction, and the like. Specifically, the light guiding optical system 140 includes a first dichroic mirror 141, a first reflection mirror 143, a second reflection mirror 145, a second dichroic mirror 148, and a plurality of collective lenses 146, 147, 149.

The first dichroic mirror 141 is disposed in a position where light of the blue wavelength range emitted from the excitation light shining device 70 and light of the green wavelength range emitted from the luminescent plate 101 intersect light of the red wavelength range emitted from the red light source device 120. The first dichroic mirror 141 transmits light of the blue wavelength range and light of the red wavelength range and reflects light of the green wavelength range. An axis of light of the green wavelength range emitted from the luminescent plate 101 is turned through 90 degrees in the direction of the left panel 15.

The first reflection mirror 143 is disposed on an axis of light of the blue wavelength range transmitted through the luminescent plate 101 or transmitted therethrough in the form of diffuse transmission and between the collective lens 115 and the front panel 12. The first reflection mirror 143 reflects light of the blue wavelength range and turns an axis thereof through 90 degrees in the direction of the left panel 15. The collective lens 146 is disposed on a side of the first reflection mirror 143 which faces the left panel 15. The second reflection mirror 145 is disposed on a side of the collective lens 146 which faces the left panel 15. The second reflection mirror 145 turns the axis of the light of the blue wavelength range which is collected by the collective lens 146 through 90 degrees so as to be directed towards the back panel 13. The collective lens 147 is disposed on a side of the second reflection mirror 145 which faces the back panel 13.

The collective lens 149 is disposed on a side of the first dichroic mirror 141 which faces the left panel 15. An axis of the light of the red wavelength range reaches the collective lens 149. An axis of the light of the green wavelength range reflected by the first dichroic mirror 141 substantially coincides with the axis of the light of the red wavelength range and also reaches the collective lens 149.

The second dichroic mirror 148 is disposed on a side of the collective lens 149 which faces the left panel 15 and on a side of the collective lens 147 which faces the back panel 13. The second dichroic mirror 148 reflects light of the red wavelength range and light of the green wavelength range and transmits light of the blue wavelength range. Thus, the light of the red wavelength range and the light of the green wavelength range which are collected by the collective lens 149 are reflected by the second dichroic mirror 148 and are then incident on a collective lens 173 of the light source-side optical system 170. On the other hand, the light of the blue wavelength range which passes through the collective lens 147 then passes through the second dichroic mirror 148 and is then collected to the incident port of the light tunnel 175 by way of the collective lens 173.

The light source-side optical system 170 includes the collective lens 173, the light tunnel 175, a collective lens 178, a light axis turning mirror 181, a collective lens 183, a light shining mirror 185 and a condenser lens 195. The condenser lens 195 emits image light emitted from the display device 51 which is disposed on a side of the condenser lens 195 which faces the back panel 13 towards the projection lens 220, and therefore, the condenser lens 195 is regarded as a part of the projection lens 220.

The collective lens 173 is disposed in the vicinity of the light tunnel 175 and collects light source light to the incident port of the light tunnel 175. The light of the red wavelength range, the light of the green wavelength range and the light of the blue wavelength range which reach the collective lens 173 are collected by the collective lens 173 and are then incident on the light tunnel 175. The pencil of light which enters the light tunnel 175 is formed into a pencil of light whose intensity is distributed uniformly by the light tunnel 175.

The collective lens 178 and the light axis turning mirror 181 are disposed on an optical axis of the light tunnel 175 on a side of the light tunnel 175 which faces the back panel 13. The pencil of light emitted from an emerging port of the light tunnel 175 is collected by the collective lens 178, and thereafter, an axis of the pencil of light so collected is turned to be directed towards the left panel 15 by the light axis turning mirror 181.

The pencil of light which is reflected by the light axis turning mirror 181 is collected by the collective lens 183 and is then shined on to the display device 51 at a predetermined angle via the condenser lens 195 by the light shining mirror 185. A heat sink 190 is provided on a side of the display device 51 which faces the back panel 13, whereby the display device 51 is cooled by this heat sink 190. The light shining mirror 185, the display device 51 and the like are accommodated in a case 50. A heat dissipating unit 90 is provided in a position situated adjacent to the case 50, and light discarded from the display device 51 is guided to the heat dissipating unit 90. A configuration inside the case 50 and the heat dissipating unit 90 will be described in detail by the use of FIG. 5 later.

When the pencil of light, which is made up of the respective lights of the red, green and blue light sources, is shined on an image forming surface of the display device 51, the pencil of light is reflected by the image forming surface of the display device 51 and is then projected on to a screen by way of the projection lens 220 as projected light. Here, the projection lens 220 includes the condenser lens 195, the movable lens group 235, and a fixed lens group 225. The movable lens group 235 is allowed to move by the lens motor. Then, the movable lens group 235 and the fixed lens group 225 are incorporated in a fixed lens barrel. Thus, the fixed lens barrel is formed into a variable-focus lens which enables zooming and focusing controls.

In the projector 10 which is configured in the way described heretofore, when the excitation light shining device 70 and the red light source device 120 emit light at different timings while the luminescent plate 101 is being rotated, light of the red wavelength range, light of the green wavelength range and light of the blue wavelength range are incident sequentially on the light source-side optical system 170 by way of the light guiding optical system 140 and are then incident on the display device 51. In the projector 10, the display device 51, which is the DMD, displays red, green and blue colors of light in a time-sharing fashion, thereby making it possible to project a color image on to the screen.

Figure 4:
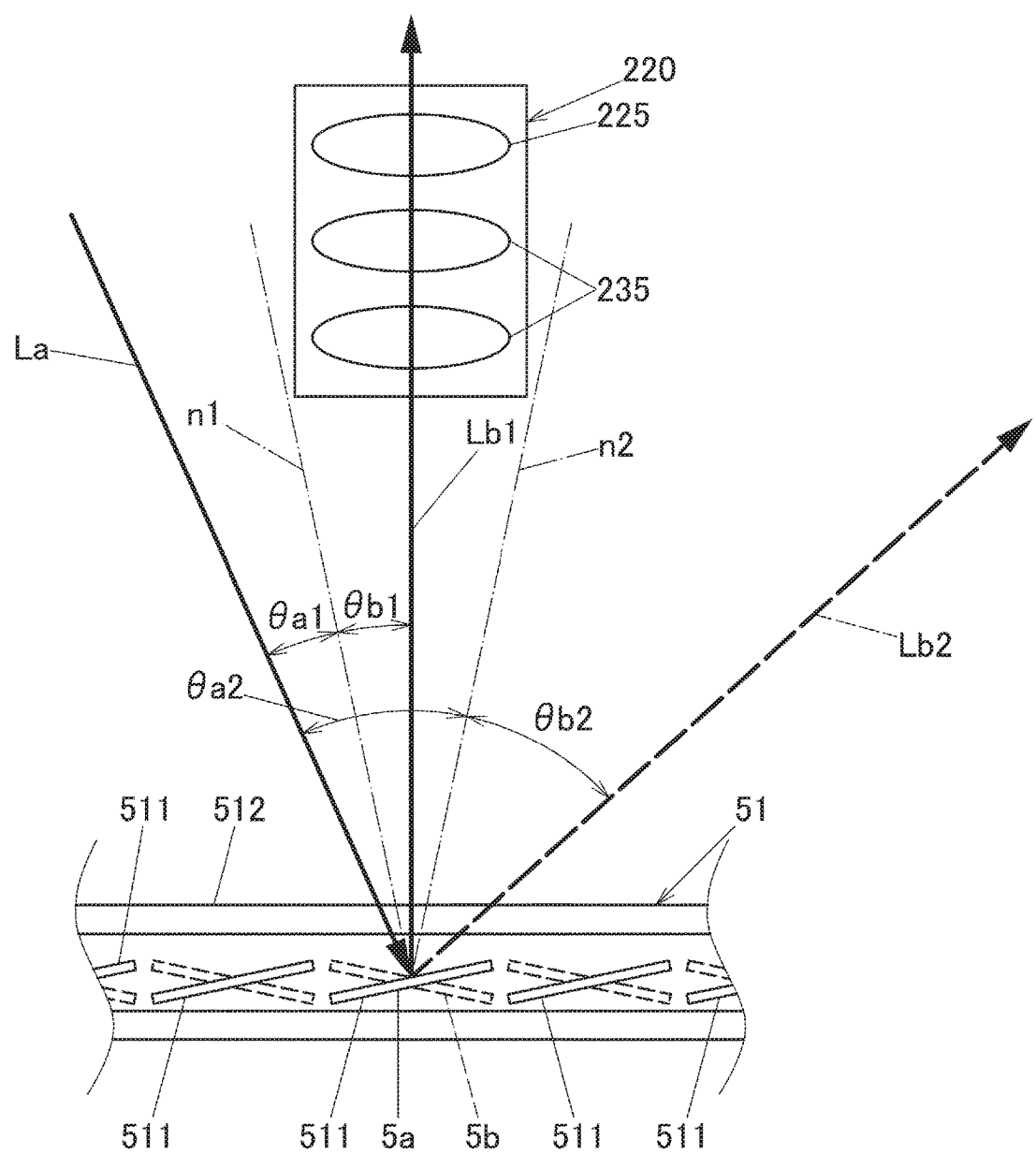
FIG. 4 is a schematic diagram illustrating an operation of a display device according to the first embodiment of the invention.

FIG. 4 is a diagram illustrating operations performed in the display device 51. The display device 51 is an optical path switching device having a plurality of mirrors 511 in an interior thereof. The display device 51 has a glass cover 512 on an incident side thereof, and this glass cover 512 covers the mirrors 511. The mirrors 511 are arranged into rows and columns. The mirrors 511 are provided in an equal or greater number to or than the number of pixels making up a projected image according to a specification of the projected image in size. The mirrors 511 can switch between an ON position 5a indicated by a solid line and an OFF position 5b indicated by a broken line. The glass cover 512 protects the mirrors 511 while transmitting light. In FIG. 4, the condenser lens 195 is omitted although the condenser lens 195 is illustrated in FIG. 3.

Here, an optical path switching operation will be described by taking incident light La which is incident on a single mirror 511 for example. When the mirror 511 is in the ON position 5a, incident light La reflected by the shining mirror 185 illustrated in FIG. 3 is incident on the mirror 511 at an incident angle θa1 with respect to a normal n1 of a reflection surface of the mirror 511 and is reflected at a reflection angle θb1. Thus, emerging light Lb1 (ON light) which is reflected on the mirror 511 when the mirror 511 is in the ON position 5a is emitted towards an exterior portion of the projector 10 by way of the movable lens group 235 and the fixed lens group 225 of the projection lens 220.

On the other hand, the incident light La which is to be incident on the mirror 511 when the mirror 511 is in the OFF position 5b is incident on the mirror 511 at an incident angle θa2 with respect to a normal n2 of the reflection surface of the mirror 511 and is reflected at a reflection angle θ2b. Light reflected on the mirror 511 when the mirror 511 is in the OFF position 5b is discarded as unnecessary discarded light Lb2 (off light) which is not used to form an image. Then, this discarded light is guided into the heat dissipating unit 90 illustrated in FIG. 5, which will be described later.

A projecting time of each mirror 511 is controlled during which light is emitted to the exterior portion of the projector 10. The switching control of the mirror 511 between the ON position 5a and the OFF position 5b is executed for each mirror 511. Namely, the light projecting time is controlled for each of pixels making up an image which the projector 10 projects.

Figure 5:
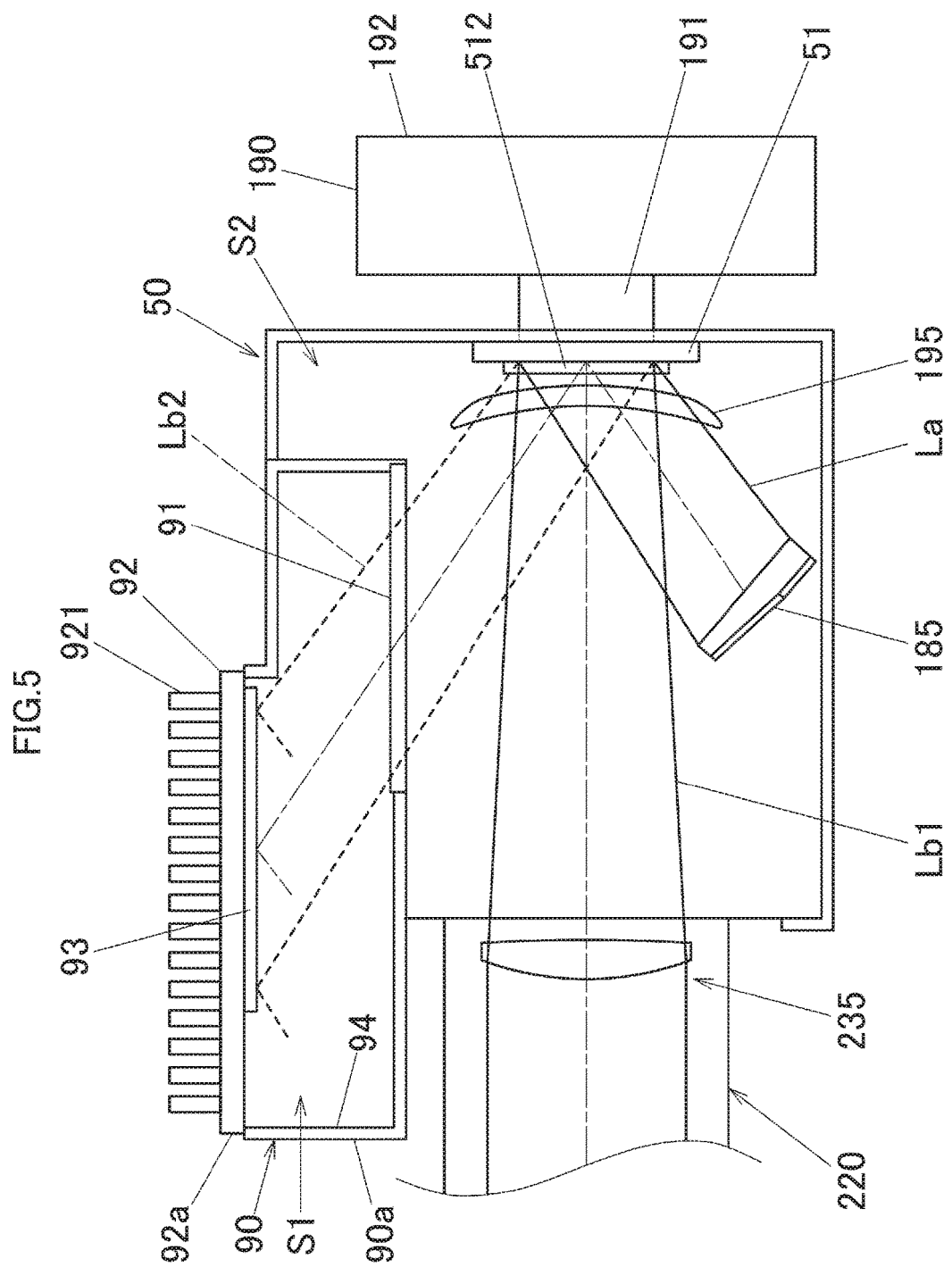
FIG. 5 is a schematic diagram illustrating the configurations of the display device, a heat dissipating unit and a projection lens of the projector according to the first embodiment of the invention.

FIG. 5 is a diagram illustrating the configurations of the display device 51, the heat dissipating unit 90 and the projection lens 220 of the projector 10. FIG. 5 is a schematic view illustrating a circumference of a portion A indicated by broken lines in FIG. 3. The light shining mirror 185, the condenser lens 195 and the display device 51 are accommodated within the case 50 where an optical path of light emitted from the light source unit 60 is formed.

The case 50 includes a heat sink 190 which is provided outside the case 50, so that the display device 51 is cooled by this heat sink 190. The heat sink 190 has a heat transmitting portion 191 and a fin 192. The heat transmitting portion 191 transmits heat generated by the display device 51 to the heat sink 190. Heat transmitted to the heat sink 190 is dissipated mainly by the fin 192.

The heat dissipating unit 90 is provided contiguous to the case 50. The heat dissipating unit 90 is formed into a box-like shape and has a space S1 which is closed tightly around a circumference thereof. A wall portion 90a of the heat dissipating unit 90 is formed of metal having a heat conducting property, and aluminum, copper or an alloy including these metals is used as a material for the wall portion 90a.

The heat dissipating unit 90 has a light transmitting member 91, a heat sink 92, a reflecting portion 93 and a light absorbing portion 94. A blackening treatment is applied to the light absorbing portion 94 using a surface treatment technique of making a surface of a base material of metal or the like black. One of specific blackening processes is a process of forming a black oxide layer on a surface of a metallic base material in which a growth of an oxide layer on the surface of the metallic base material is activated electrically so that the surface of the metallic base material looks black due to an increase in thickness of the growing oxide layer and is then subjected to electrolytic color development. Other blackening processes include chemical conversion coating, anodizing (anodic oxidation), black electroless plating, blackbody painting and the like. Consequently, almost all light in the visible light wavelength range of 380 nm to 750 nm can be absorbed by the blackened surface of the metallic base material, thereby making it possible to obtain a light reflection preventing effect in which almost no such light is reflected. The light transmitting member 91 is provided on a portion of the wall portion 90a of the heat dissipating unit 90 which faces the display device 51. The light transmitting member 91 is formed of a light transmitting material such as glass, plastic and the like.

The heat sink 92 has a main body portion 92a and a plurality of fins 921 which are formed on the main body portion 92a. The space S1 in an interior of the heat dissipating unit 90 can be formed by the wall portion 90a, the light transmitting member and the main body portion 92a. By adopting this configuration, the space S1 in the interior of the heat dissipating unit 90 can be separated from a space S2 inside the case 50 where the display device is disposed. The main body portion 92a of the heat sink 92 and the light transmitting member are provided in opposite positions within the heat dissipating unit 90.

The reflecting portion 93 is formed on a rear surface of the main body portion 92a which is a side facing the space S1. The reflecting portion 93 reflects discarded light Lb2 which is guided by the display device 51 and guides it to a portion of the wall portion 90a where the light absorbing portion 94 is formed.

The light absorbing portion 94 is formed on an inner surface of the wall portion 90a which faces the space S1. The light absorbing portion 94 is formed by forming a coating on an inner wall or providing a separate light absorbing member on the inner wall. The light absorbing portion 94 absorbs light in the visible light wavelength range. The light absorbing portion 94 converts discarded light Lb2 shined thereon into heat and transmits the heat to the wall portion 90a of the heat dissipating unit 90. The light absorbing portion 94 may be provided partially or entirely in the interior of the heat dissipating unit 90.

Figure 6A:
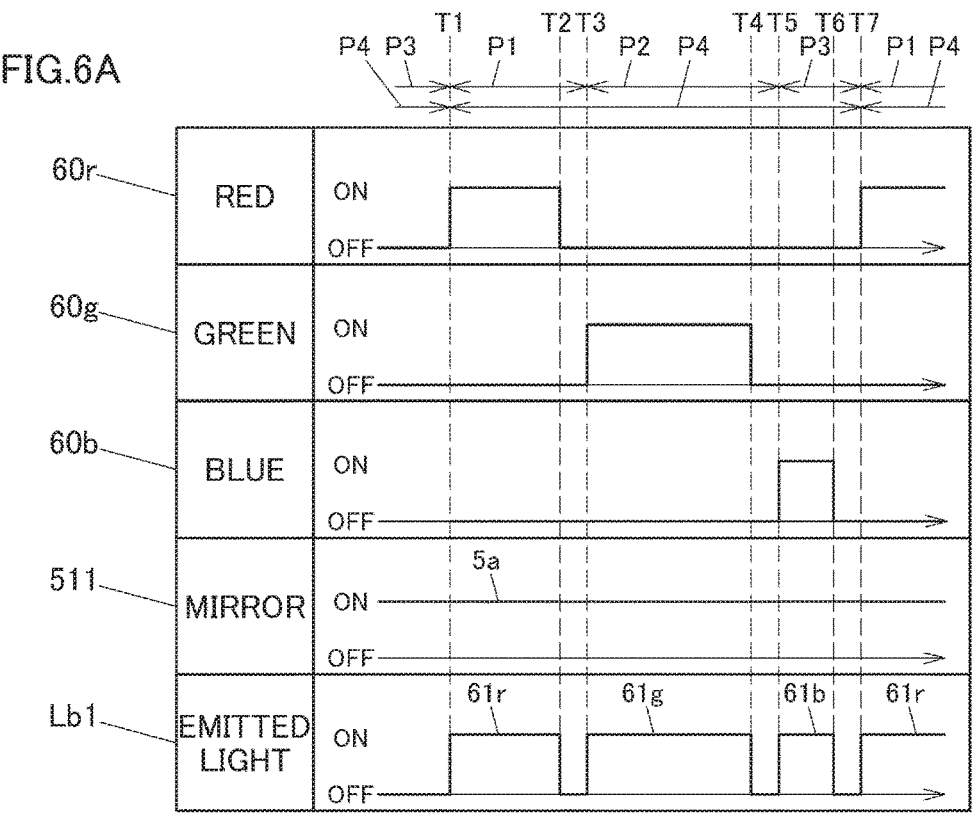
FIG. 6A is a timing chart illustrating operations of a light source system and mirrors according to the first embodiment of the invention when the mirrors emit white light.
Figure 6B:
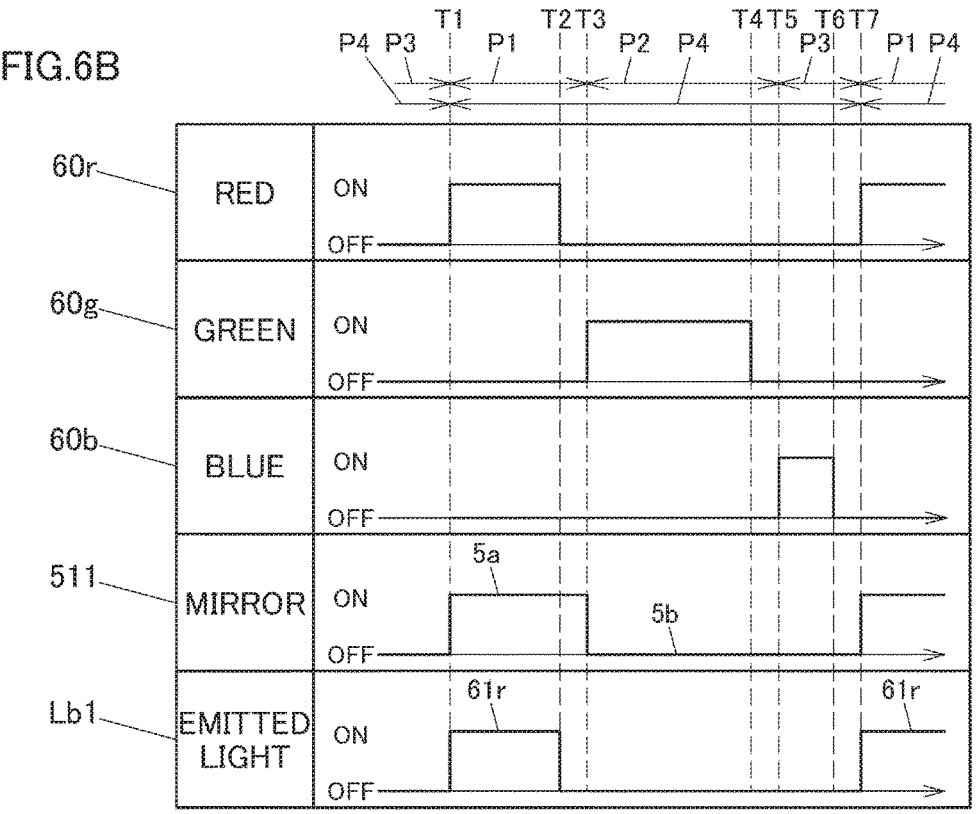
FIG. 6B is a timing chart illustrating operations of the light source system and the mirrors according to the first embodiment of the invention when the mirrors emit light of a red wavelength range.

Next, operation examples of the mirrors 511 of the projector 10 will be described. FIG. 6A is a timing chart illustrating operations of the light source unit 60 and the mirrors 511 when the mirrors 511 emit white light. In addition, FIG. 6B is a timing chart illustrating operations of the light source unit 60 and the mirrors 511 when the mirrors 511 emit light of the red wavelength range.

The projector 10 has one frame unit period P4 starting from a timing T1 and ending at a timing T7. FIGS. 6A and 6B illustrate emitting timings of light of the red wavelength range 60r, light of the green wavelength range 60g and light of the blue wavelength range 60b which are incident light La (refer to FIG. 5) from the light source unit 60, operating timings of the mirrors 511, and emitting timings of emerging light Lb1 emitted from the mirrors 511. The projector 10 forms an arbitrary color of light for each pixel using red, green and blue lights emitted from the light source unit 60 every frame unit period P4.

Operations illustrated in FIG. 6A will be described. In a red segment period P1 starting from the timing T1 and ending at a timing T3, the light source unit 60 emits light of the red wavelength range 60r. The light source unit 60 does not emit light of the red wavelength range 60r in a period from a timing T2 to the timing T3 to avoid mixing of light of the red wavelength range 60r with light of the green wavelength range 60g which is emitted in the following green segment period P2. The mirrors 511 stay in the ON position 5a (also, refer to FIG. 4) at all times over their operating period illustrated in FIG. 6A. Thus, in a period from the timing T1 to the timing T2 where the light source unit 60 is emitting light of the red wavelength range 60r, light of the red wavelength range 60r is emitted as emerging light Lb1 which is guided to the projection lens 220.

The light source unit 60 emits light of the green wavelength range 60g in a green segment period P2 starting from the timing T3 and ending at a timing T5. The light source unit 60 does not emit light of the green wavelength range 60g in a period from a timing T4 to the timing T5 to avoid mixing of light of the green wavelength range 60g with light of the blue wavelength range 60b which is emitted in the following blue segment period P3. Thus, in a period from the timing T3 to the timing T4 where the light source unit 60 is emitting light of the green wavelength range 60g, light of the green wavelength range 60g is emitted as emerging light Lb1 which is guided to the projection lens 220.

The light source unit 60 emits light of the blue wavelength range 60b in a blue segment period P3 starting from the timing T5 and ending at a timing T7. The light source unit 60 does not emit light of the blue wavelength range 60b in a period from a timing T6 to the timing T7 to avoid mixing of light of the blue wavelength range 60b with light of the red wavelength range 60r which is emitted in the following red segment period P1. Thus, in a period from the timing T5 to the timing T6 where the light source unit 60 is emitting light of the blue wavelength range 60b, light of the blue wavelength range 61b is emitted as emerging light Lb1 which is guided to the projection lens 220.

The emitting times of light of the red wavelength range 61r, light of the green wavelength range 61g and light of the blue wavelength range 61b in the frame unit period P4 are controlled by the times during which the mirror 511 stays in the ON position 5a and the OFF position 5b. This enables the display device 51 to emit an arbitrary color of light to the exterior portion of the projector 10 for each pixel to thereby be able to project a color image as a whole. In the case of FIG. 6A, white light is created by light of the red wavelength range 61r, light of the green wavelength range 61g and light of the blue wavelength range 61b, and hence, emerging light Lb1 emitted during the frame unit period P4 becomes white light.

On the other hand, in operations illustrated in FIG. 6B, as with the operations illustrated in FIG. 6A, the light source unit 60 emits light of the red wavelength range 60r during the period from the timing T1 to the timing T2, emits light of the green wavelength range 60g in the period from the timing T3 to T4 and emits light of the blue wavelength range 60b in the period from the timing T5 to the timing T6.

In their operating period illustrated in FIG. 6B, the mirrors 511 stay in the ON position 5a during in the red segment period P1, while the mirrors 511 stay in the OFF position 5b during the other green segment period P2 and blue segment period P3.

Thus, light of the red wavelength range 60r is emitted as emerging light Lb1 during the period from the timing T1 to the timing T2. On the other hand, light of the green wavelength range 60g and light of the blue wavelength range 60b which are emitted from the light source unit 60 during the period from the timing T3 to the timing t4 and the period from the timing T5 to the timing T6, respectively, are guided towards the heat dissipating unit 90 as discarded light Lb2 (refer to FIGS. 4 and 5). Thus, in the case of FIG. 6B, emerging light Lb1 emitted during the frame unit period P4 becomes red light.

In FIG. 5, the discarded light Lb2 guided into the space S1 (in the example illustrated in FIG. 6B, the light of the green wavelength range 60g and the light of the blue wavelength range 60b) is reflected on the reflecting portion 93 and is then guided to the light absorbing portion 94 inside the heat dissipating unit 93. The light absorbing portion 94 absorbs the discarded light Lb2 and transforms it into heat. The heat transformed from the discarded light Lb2 in the light absorbing portion 94 is transmitted to the wall portion 90a. The heat sink 92 dissipates the heat in the wall portion 90a mainly from the fins 921.

In FIG. 5, although all the mirrors 511 of the display device 51 stay in the ON position 5a or the OFF position 5b collectively, in reality, the mirrors 511 for the corresponding pixels can be switched individually between the ON position 5a and the OFF position for different periods of time and at different timings. The frame unit periods P4 are set continuously in a time-sharing fashion, and the projector 10 can emit a different color of light every frame unit period P4.

Thus, in the first embodiment, an increase in temperature of the member such as the display device 51 or the like which is provided in the case 50 can be prevented because heat generated by the discarded light Lb2 can be dissipated with good efficiency by the heat dissipating unit 90 connected to the case 50.

Second Embodiment

Next, a second embodiment will be described. FIG. 7 is a diagram illustrating the configurations of a display device 51, a heat dissipating unit 90A and a projection lens 220 of a projector 10. In this embodiment, a case 50 includes a collective lens 95. In the description of this embodiment, like reference numerals will be given to like configurations to those of the first embodiment, and the description thereof will be omitted or simplified.

The collective lens 95 is disposed between the display device 51 and the heat dissipating unit 90A. The collective lens 95 is a convex lens which bulges outwards on a side facing the heat dissipating unit 90A. The collective lens 95 collects discarded light Lb2 emitted from the display device 51 and then guides it towards the heat dissipating unit 90A.

A wall portion 90a of the heat dissipating unit 90A is formed so that an end portion of a portion of the wall portion 90a which faces the collective lens 95 connects to a reflecting surface 93a of a reflecting portion 93. This closes a space S1 inside the heat dissipating unit 90A. A light transmitting member 91A is formed at a boundary portion between the reflecting surface 93a and the wall portion 90a which is connected on the reflecting surface 93a. The discarded light Lb2 which is collected by the collective lens 95 enters an interior of the light transmitting member 91A, is then reflected on the reflecting portion 93 and is collected into an interior of the space S1.

Thus, in the projector 10 including the heat dissipating unit 90A of this embodiment, the collective lens 95 is provided on an optical path of the discarded light Lb2. This allows the discarded light Lb2 which is to be guided into an interior of the heat dissipating unit 90A to be collected to such an extent that a light transmitting area of the light transmitting member 91A can be made smaller than that of the light transmitting member 91 of the first embodiment. This can reduce a risk of part of the discarded light Lb2 which is guided into the interior of the heat dissipating unit 90A being reflected inside the heat dissipating unit 90A to return to a space S2 inside the case 50.

With the projector 10 including the heat dissipating units 90, 90A described in the first embodiment and the second embodiment, respectively, an increase in temperature inside the case 50 can be reduced by the form of utilization of the projector 10 by the user or the colors of projected images, thereby making it possible to reduce the influence of heat on the display device 51. This can extend the service life of the display device 51 and stabilize the quality of images created by the display device 51. Additionally, an increase in temperature inside the case 50 by the discarded light Lb2 can be reduced, whereby the size of the heat sink 190 used to cool the display device 51 can be reduced. This can reduce the weight of the projector 10 and enhance the degree of freedom in layout inside the projector 10 and design of the projector 10.

In the first and second embodiments, the space S1 defined inside the heat dissipating units 90, 90A is described as the closed space. However, as long as the interior of the space S1 is isolated from the space S2 inside the case 50, an opening portion or an air passageway may be provided in the space S1. Thus, the heat dissipating portions 90, 90A can be configured so that cooling air within the projector 10 is allowed to flow into the space S1 or outside air is allowed to flow into the space S1.

In FIGS. 5 and 7, an air layer is formed in the space S1, and a heat insulation effect can be attained between the heated wall portion 90a and the light source case 50 by the air layer. However, a heat insulation member may be provided at the boundary portion between the case 50 and the heat dissipating unit 90 in FIG. 5. Additionally, a heat insulation member may be provided at the boundary portion between the case 50 and the heat sink 92 in FIG. 7. This can prevent heat generated in the heat dissipating units 90, 90A from being transmitted to the case 50. Thus, the heat inside the heat dissipating units 90, 90A can be dissipated mainly by the heat sink 92 with good efficiency.

The reflecting portion 93 may not be provided in the heat dissipating units 90, 90A in the first and second embodiments. A metallic light absorbing portion 94 to which a blackening treatment is applied can be provided in place of the reflecting portion 93 in the position of the reflecting portion 93 on which the discarded light Lb2 is shined illustrated in FIGS. 5 and 7. The light absorbing portion 94 can be provided entirely or partially on an inner wall of the wall portion 90a.

The heat dissipating units 90, 90A do not have to be contiguous to the case 50. For example, the case 50 and the heat dissipating units 90, 90A can be disposed in positions which are spaced away from each other. The case 50 and the heat dissipating units 90, 90A may be attached to separate members. Alternatively, in fixing the heat dissipating units 90, 90A to the case 50, the heat dissipating units 90, 90A can be fixed to the case 50 via a rod-like, pillar-like or plate-like connecting member. As this occurs, the case 50 and the heat dissipating portions 90, 90A each have a light transmitting portion, whereby the discarded light Lb2 reflected by the display device 51 is allowed to be guided into the heat dissipating units 90, 90A via the light transmitting members of the case 50 and the heat dissipating units 90, 90A. This can prevent heat generated by the discarded light Lb2 from being transmitted to the member disposed inside the case 50. In addition, the heat dissipating units 90, 90A can be disposed freely in an arbitrary position inside the projector 10.

The projection lens 220 should constitute an optical path on an opening portion side of the projector 10 into which image light is emitted from the display device 51 which is the optical path switching device. The projection lens 220 may also include other optical members such as a mirror, a filter and the like in addition to the fixed lens group 225 and the movable lens group 235 which are illustrated in FIG. 3. In addition, a spatial optical modulator other than the DMD may be used for the optical path switching device.

Thus, as has been described heretofore, with the projector 10 according to the first and second embodiments, the optical path switching device (the display device 51) is provided in the interior of the case 50 which is isolated from the space S1 inside the heat dissipating units 90, 90A, and light emitted by the light source unit 60 is switched to be guided either to the projection lens 220 or the heat dissipating units 90, 90A. Due to this, heat is generated in the member different from the case 50 where the optical path switching device is disposed as a result of the discarded light Lb2 being shined on the member. Thus, it becomes possible to reduce the influence of the heat generated by the discarded light Lb2 on the optical path switching device. Additionally, the space S1 inside the heat dissipating units 90, 90A and the space S2 inside the case 50 are isolated from each other. Thus, it becomes possible to ensure the dust-proof performance of the case 50. Even though a heat sink is provided for the optical path switching device, the heat sink can be made small in size. Thus, it becomes possible to provide the projector 10 having the increased heat dissipating performance.

The heat dissipating units 90, 90A include the light transmitting members 91, 91A configured to transmit light emitted from the optical path switching device. This enables the discarded light Lb2 to be guided while isolating the space S1 inside the heat dissipating units 90, 90A from the space S2 inside the case 50 where the optical path switching device is disposed.

The heat dissipating units 90, 90A constitute the closed space. This can prevent heat generated inside the heat dissipating units 90, 90A from being transmitted to other members outside the heat dissipating units 90, 90A.

The heat dissipating units 90, 90A have the light absorbing portion 94 in the interior thereof. This can transform the discarded light Lb2 guided from the optical path switching device into heat with good efficiency. Additionally, this can reduce a risk of the discarded light which once enters the heat dissipating units 90, 90A passing back through the light transmitting members 91, 91A to leak into the space S2 where the optical path switching device is disposed.

The heat dissipating units 90, 90A include the heat sink 92. This can dissipate heat generated in the heat dissipating units 90, 90A by the discarded light Lb2 with good efficiency.

The collective lens 95 is provided between the optical path switching device within the case 50 and the heat dissipating unit 90A. This enables the discarded light Lb2 to be collected, thereby making it possible to make the light transmitting area of the light transmitting member 91A provided in the heat dissipating unit 90A smaller than a light transmitting area which would result when the collective lens 95 is not provided.

The heat dissipating units 90, 90A are connected to the case 50 via the heat insulating member. This can reduce a risk of heat generated in the heat dissipating units 90, 90A by the discarded light Lb2 being transmitted to the case 50 where the optical path switching device is disposed.

The optical path switching device is the display device 51 configured to form image light, and the projection lens 220 projects projected light formed by the display device 51 to an exterior portion. This can provide the projector 10 having the increased heat dissipating performance. The light source system of the invention is not always provided in a projector. Hence, the light source system of the invention may be provided, for example, in a lamp or other illumination apparatus.

While the embodiments of the invention have been described heretofore, these embodiments are presented as examples, and hence, there is no intention to limit the scope of the invention by the embodiments. These novel embodiments can be carried out in other various forms, and various omissions, replacements and modifications can be made without departing from the spirit and scope of the invention. Those resulting embodiments and their modifications are included in the spirit and scope of the invention and are also included in the scope of inventions claimed for patent under claims below and their equivalents.

What is claimed is:

1. A light source system comprising:
   a light source unit;
   an optical path switching device configured to selectively switch a direction of incident light from the light source unit between a plurality of emission directions different than the direction of the incident light;
   a heat dissipating unit which is positioned in one of the plurality of emission directions, which is different from a direction towards a projection lens; and
   a light transmitting member which separates a space in which the optical path switching device is disposed from a space formed by the heat dissipating unit,
   wherein the space in which the optical path switching device is disposed and the space formed by the heat dissipating member are different tightly closed spaces on opposite sides of the light transmitting member.

2. The light source system according to claim 1, wherein the optical path switching device is provided within a case which is isolated from the closed space of the heat dissipating unit, and
   wherein the light transmitting member transmits light emitted from the optical path switching device.

3. The light source system according to claim 2, wherein the heat dissipating unit is connected to the case via a heat insulating member.

4. The light source system according to claim 1, wherein the heat dissipating unit comprises a heat sink.

5. The light source system according to claim 4, wherein the closed space of the heat dissipating unit is surrounded by a wall portion, the light transmitting member, and the heat sink around a circumference thereof.

6. The light source system according to claim 5, wherein a light absorbing portion configured to absorb light guided from the optical path switching device is provided on a side of the heat sink which faces the closed space.

7. The light source system according to claim 5, wherein a reflecting portion configured to reflect light guided from the optical path switching device is provided on a side of the heat sink which faces the closed space.

8. The light source system according to claim 7, wherein a light absorbing portion is provided on a side of the wall portion which faces the closed space, and
   wherein the light guided from the optical path switching device is reflected by the reflecting portion and is guided to the light absorbing portion on the wall portion.

9. The light source system according to claim 1, further comprising:
   a collective lens disposed between the optical path switching device and the heat dissipating unit.

10. The light source system according to claim 1, wherein the optical path switching device comprises a plurality of mirrors.

11. A projector comprising:
    a light source unit;
    a display device configured to selectively switch a direction of incident light from the light source unit between a plurality of emission directions different than the direction of the incident light, to form an optical image;
    a projection lens configured to project the optical image from the display device; and
    a heat dissipating unit on which light from the display device is incident as a result of the light from the display device being shined in a different direction than a direction towards the projection lens;
    a light transmitting member which separates a space in which the display device is disposed from a space formed by the heat dissipating unit,
    wherein the space in which the display device is disposed and the space formed by the heat dissipating member are different tightly closed spaces on opposite sides of the light transmitting member.

12. The projector according to claim 11, wherein the display device is provided in a case which is isolated from the closed space of the heat dissipating unit, and
    wherein the light transmitting member transmits light emitted from the display device.

13. The projector according to claim 12, wherein the heat dissipating unit is connected to the case via a heat insulating member.

14. The projector according to claim 11, wherein the heat dissipating unit comprises a heat sink.

15. The projector according to claim 14, wherein the closed space of the heat dissipating unit is surrounded by a wall portion, the light transmitting member, and the heat sink around a circumference thereof.

16. The projector according to claim 15, wherein a light absorbing portion configured to absorb light guided from the display device is provided on a side of the heat sink which faces the closed space.

17. The projector according to claim 15, wherein a reflecting portion configured to reflect light guided from the display device is provided on a side of the heat sink which faces the closed space.

18. The projector according to claim 17, wherein a light absorbing portion is provided on a side of the wall portion which faces the closed space, and
    wherein the light guided from the display device is reflected by the reflecting portion and is guided to the light absorbing portion on the wall portion.

19. The projector according to claim 11, further comprising:
    a collective lens disposed between the display device and the heat dissipating unit.

20. The projector according to claim 11, wherein the display device comprises a plurality of mirrors, and
  wherein the projection lens projects an image onto an image receiving member by projecting ON light which forms the optical image demodulated by the display device.

* * * * *